Jan. 26, 1960

A. FISHER 2,922,482

FOUR WHEEL DRIVEN AND STEERED TRACTOR

Filed Aug. 20, 1954

INVENTOR.
Andrew Fisher
BY
Atty.

Jan. 26, 1960  A. FISHER  2,922,482
FOUR WHEEL DRIVEN AND STEERED TRACTOR
Filed Aug. 20, 1954  8 Sheets-Sheet 3

INVENTOR.
Andrew Fisher
BY
Atty.

Jan. 26, 1960 A. FISHER 2,922,482
FOUR WHEEL DRIVEN AND STEERED TRACTOR
Filed Aug. 20, 1954 8 Sheets-Sheet 4

INVENTOR.
Andrew Fisher
BY
Atty.

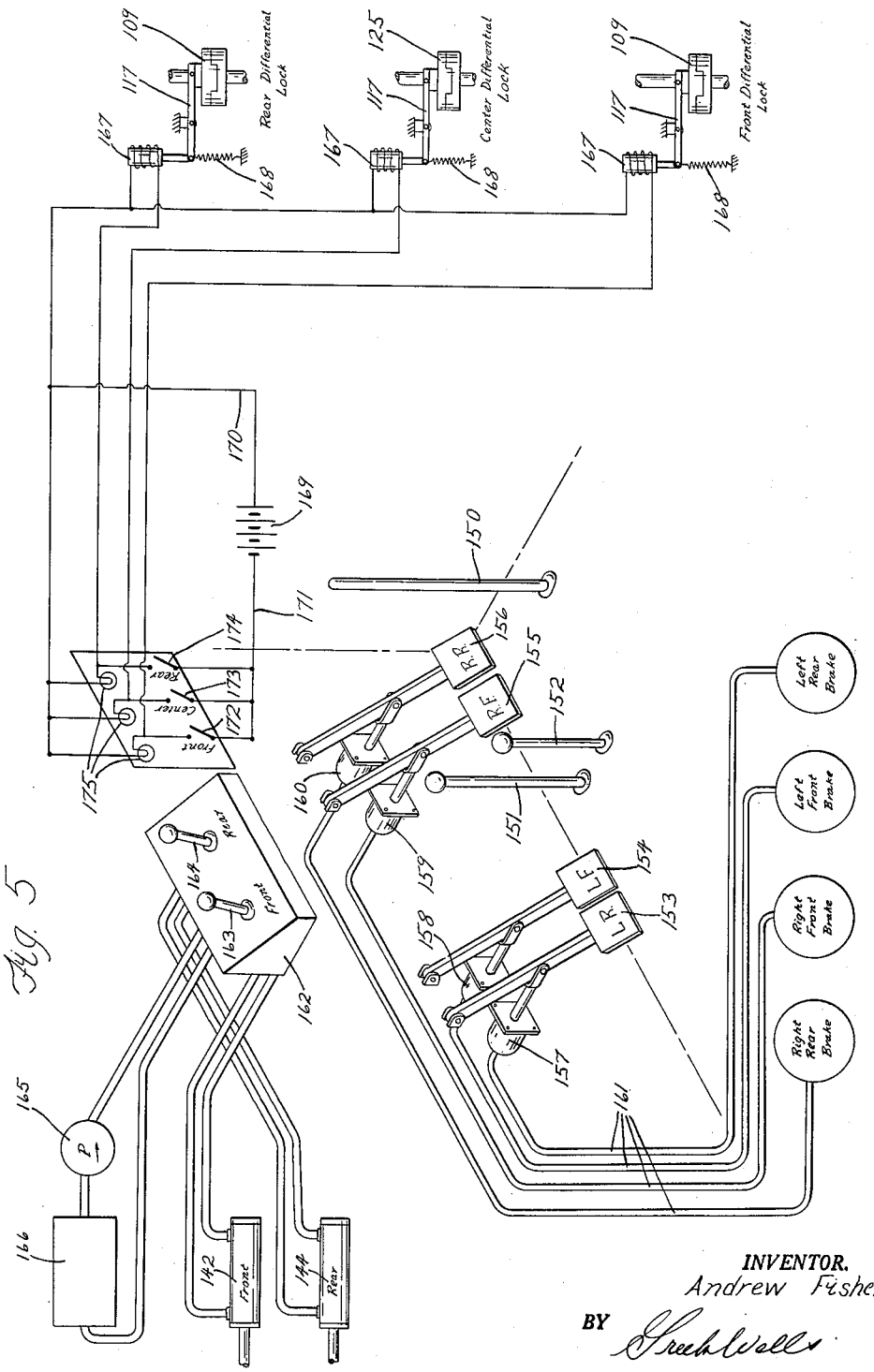

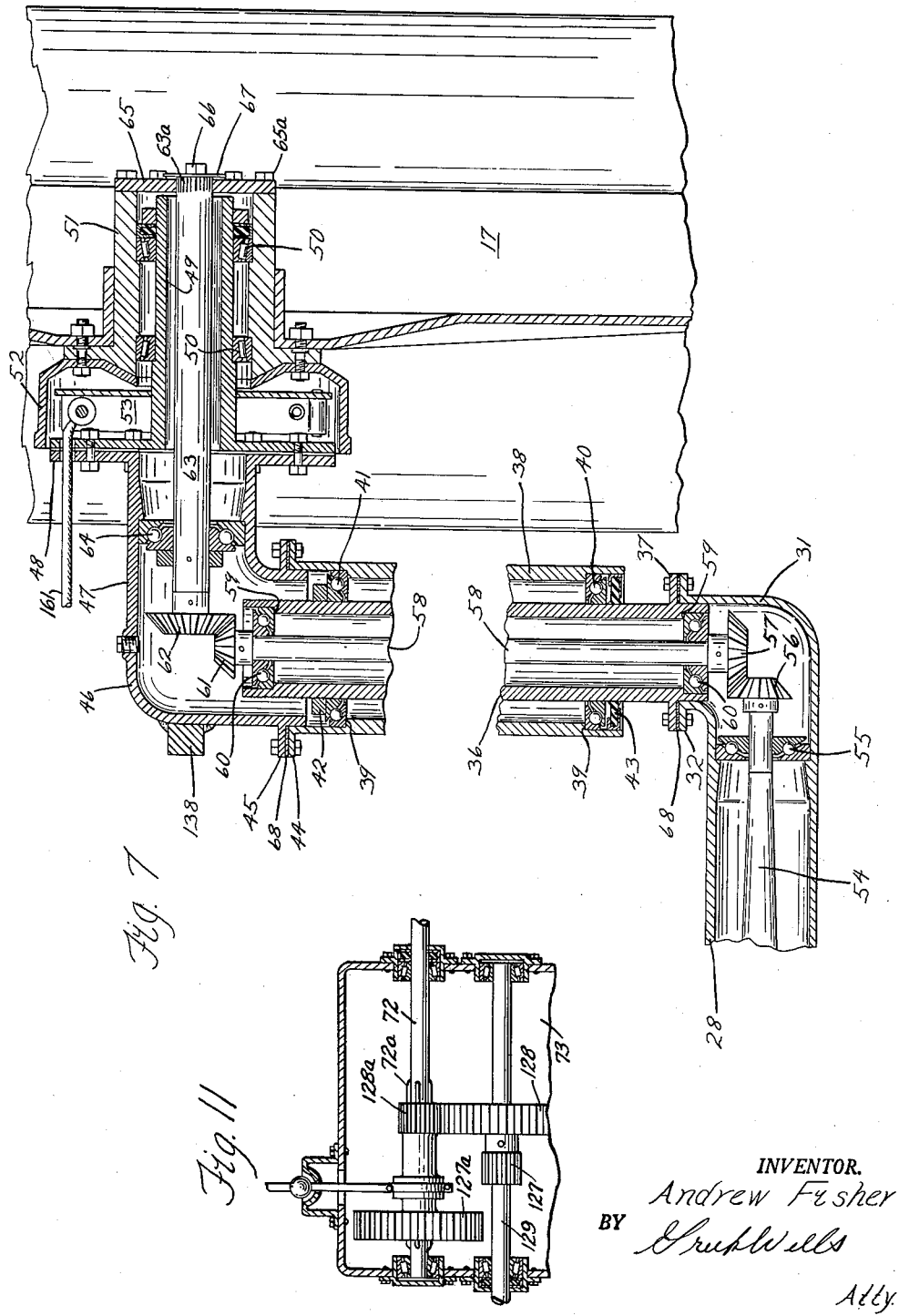

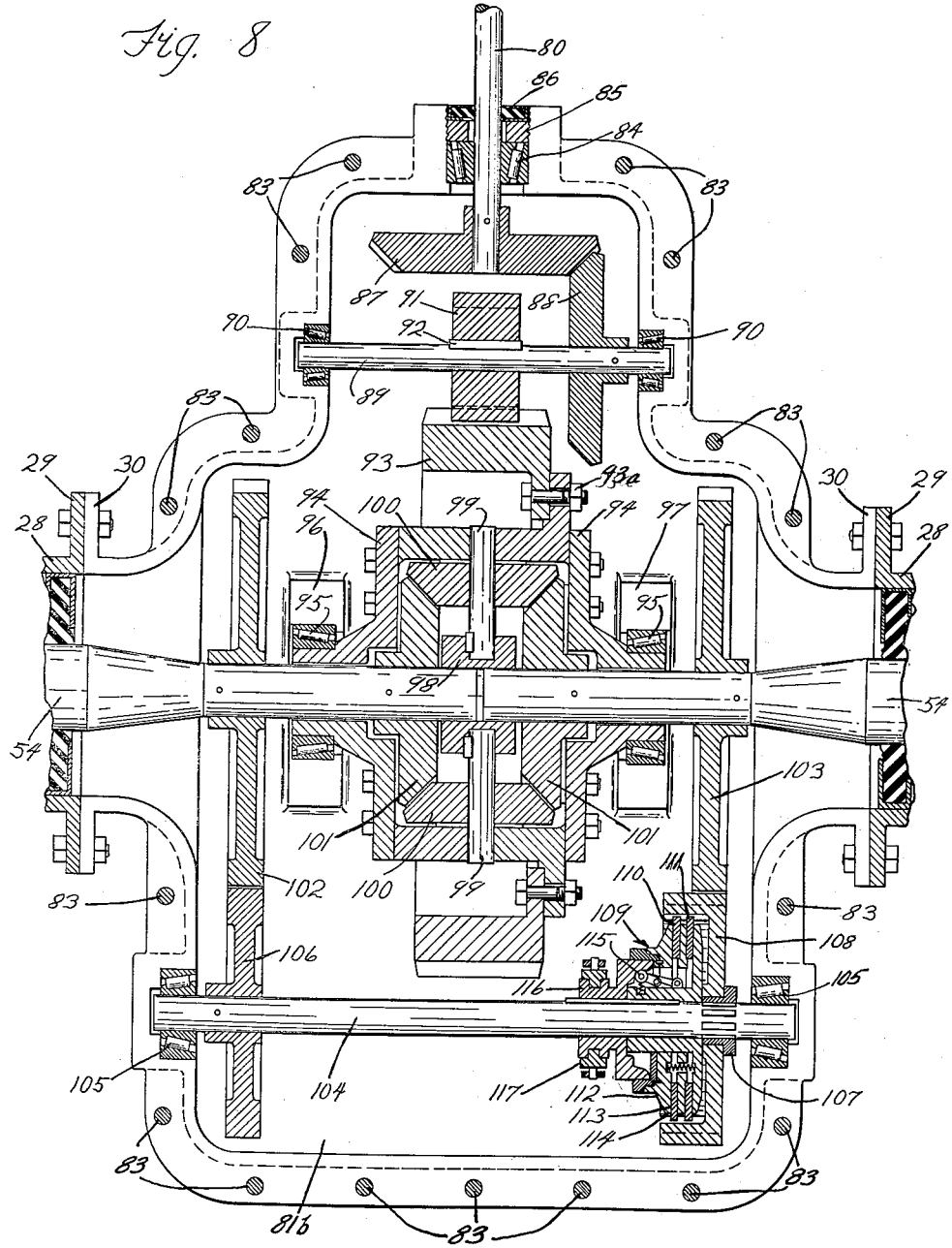

Jan. 26, 1960 A. FISHER 2,922,482
FOUR WHEEL DRIVEN AND STEERED TRACTOR
Filed Aug. 20, 1954 8 Sheets-Sheet 8

INVENTOR.
Andrew Fisher
BY *Fred Wells*
Atty.

United States Patent Office 2,922,482
Patented Jan. 26, 1960

2,922,482
FOUR WHEEL DRIVEN AND STEERED TRACTOR

Andrew Fisher, Deer Park, Wash.

Application August 20, 1954, Serial No. 451,103

5 Claims. (Cl. 180—45)

The present invention relates to improvements in a wheel type tractor.

It is the principal purpose of this invention to provide a wheel type tractor of sufficient power and maneuverability to replace the large crawler type tractors presently in use. A wheel tractor having the same power capabilities as a large crawler tractor will overcome many of the difficulties encountered by the crawler tractor.

One of the main drawbacks of the crawler tractor is that it necessitates steering-by-power. In order to turn a crawler, one must remove the power from one track and sometimes brake that track to bring the machine around. This removes tractive power from the machine when it most needs it, and means that the machine must be either shifted to a low gear when approaching a corner or run constantly in a lower gear than is necessary to pull the load. A wheel tractor having the same drawing power is able to turn by steering the wheels while full power is applied.

Another drawback of the crawler tractor is that it is necessary to switch the tracks at intervals to equalize the wear. This is a large undertaking which consumes a large amount of valuable time and manpower. With a wheel tractor, the switching of tires is a much smaller task.

It is a purpose of my invention to provide a four wheeled tractor wherein the wheel mounting, the framing, the power delivery to the wheels and the draw-bar to center of gravity relation are such that the draw-bar pull and the weight of the tractor cooperate to produce the most effective engagement of the wheels with the ground, together with means to concentrate the power on the particular wheel or wheels that, because of the nature of the ground may have the best traction at a particular time.

In order to enable a wheel tractor to perform most efficiently, it is necessary that the rubber tires be of considerable size so that they may have sufficient traction and not sink into loose soil. However, with present day construction the use of extremely large wheels raises the axles and consequently the frame of the machine high above the ground. Unless the width is increased proportionally, the tractor will be unstable for hill side operation due to its high center of gravity.

One of the objects of my invention is to provide a wheel tractor having rubber tires of considerable size while maintaining the frame of the machine close to the ground. To accomplish this, I utilize U-shaped axles. These axles are positioned under the frame of the device in the usual manner and have upstanding portions at each end outside of the frame which extend upwardly to the height of the wheel hubs. The upstanding portions have horizontal extensions at their upper ends to which the wheels are mounted. The driving means for the wheels are positioned within the U-shaped axles and include bevel gears at the top and bottom of the upstanding portions.

My invention also contemplates the use of separate steering for the front and rear wheels of the tractor. This separate steering of each pair of wheels allows the tractor a maximum of maneuverability in the field. Both the front and rear wheels may be turned together to the right or left to compensate for slippage when the machine is traveling along a side hill. The rear wheels may be turned in the opposite direction from the front wheels to enable the tractor to make square corners while cultivating land. Either the front or rear wheels may be used alone to steer the tractor when desired. The construction of the axles lends itself conveniently to steerable wheels. The upstanding portions of each axle are constructed of two concentric sleeves with bearings between them. The outer sleeve carries the wheel and is rotatable about the inner sleeve. The outer sleeves of the upstanding portions of each axle carry steering levers. The levers of each pair of wheels are tied together by tie rods which extend across the frame of the tractor. Two hydraulic cylinders are attached to the frame of the machine and extend outwardly to one of the levers of each pair of wheels. Pressure for the cylinders is supplied by a pump driven by the power plant. By supplying fluid to the desired cylinder, the operator may turn each pair of wheels to the right or left independently of the other pair.

Another object of the invention is to provide individual braking for each wheel. This is accomplished by providing four brake pedals in the operator's compartment, each pedal actuating a separate master cylinder. Brake lines are provided for each master cylinder and extend to the four wheels. The usual brake drum, shoes, and associated mechanisms are provided in each hub.

Still another object of my invention is to provide a wheel type tractor having four wheel drive so that a maximum of tractive power may be supplied to the draw-bar. The invention also contemplates means to drive the shaft that supplies power to the front pair of wheels and the shaft that supplies power to the rear wheels with differential action between them to accommodate turning, slipping, etc., or to drive both shafts at the same speed to concentrate the available power on the front or rear wheels when the others have no traction. Means adapted to provide power to the two wheels on each axle in the same manner are also provided. In order to accomplish this, I use three differential units, a differential in each axle and a center differential through which power is supplied to the drive shafts for the front and rear axles. Each of the three differentials includes a locking mechanism so that the drive shafts extending therefrom may be locked together to rotate at the same speed. Under normal conditions none of the differentials are locked and each wheel receives power as its traction permits. However if the machine is traveling under conditions such that one pair of wheels is slipping, the center differential may be locked to insure that power is concentrated on the other pair. If any one wheel begins to slip the differential on that axle may be locked to give power to the other wheel.

The nature and advantages of my invention will appear more fully in the following description and the accompanying drawings. The description and drawings are illustrative only, and are not intended to limit the invention except insofar as it is limited by the claims.

In the drawings:

Figure 5 is a diagrammatic view illustrating the control mechanism of the tractor;

Figure 7 is an enlarged sectional view of a portion of one of the axles of the tractor taken substantially on the line 7—7 of Figure 3;

Figure 8 is an enlarged sectional view of one of the differential units mounted on the axles of the tractor taken substantially on the line 8—8 of Figure 4;

Figure 11 is a fragmentary sectional view taken on the line 6—6 of Figure 3, showing the mechanism above Figure 6.

Figure 1:
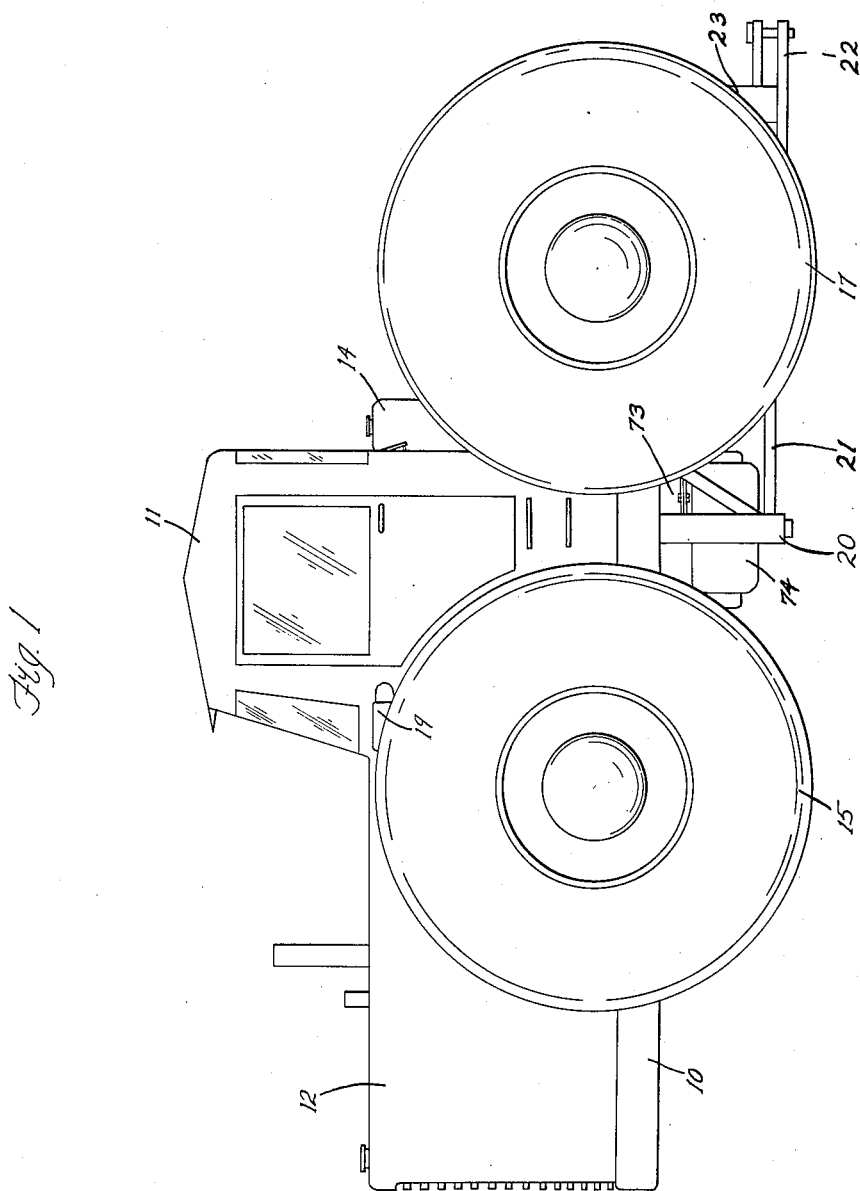
Figure 1 is a view in side elevation of a wheel type tractor embodying my invention.
Figure 2:
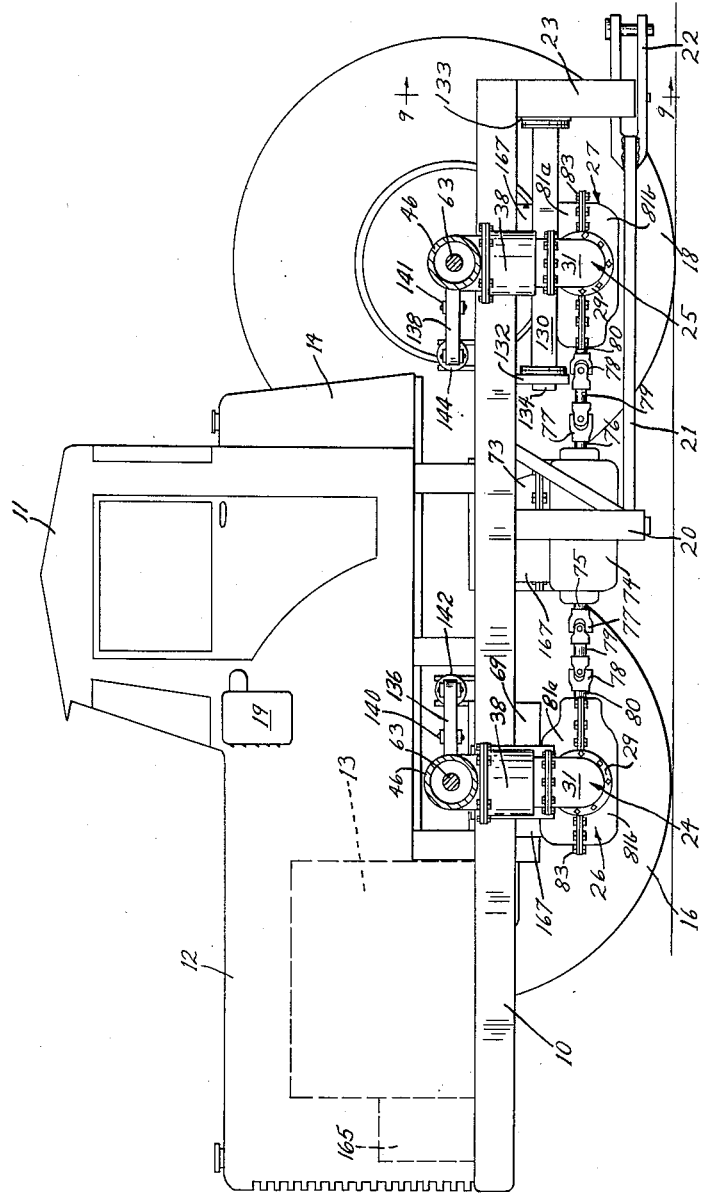
Figure 2 is a view similar to Figure 1 but showing the two left wheels of the vehicle removed.
Figure 3:
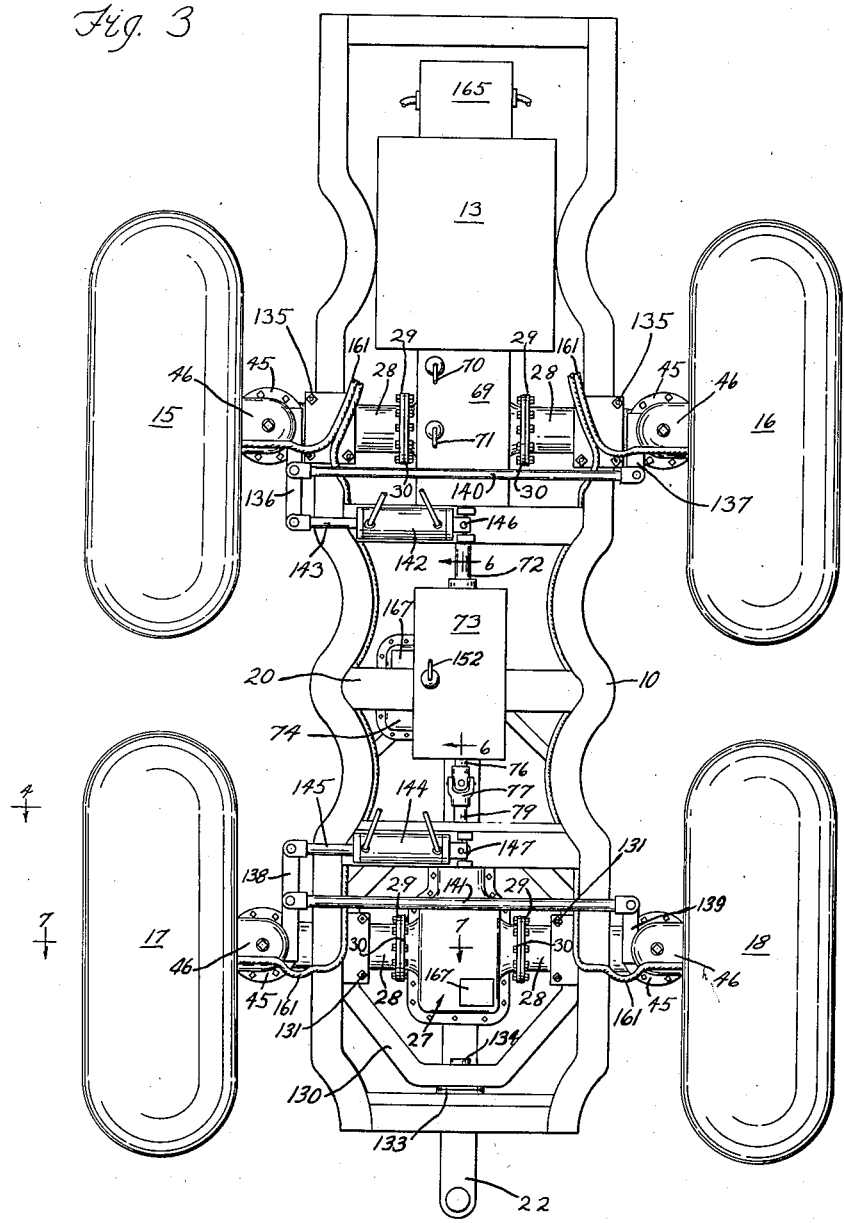
Figure 3 is a somewhat diagrammatic plan view of the tractor frame with the cab and hood removed.

Referring now to the drawings and to Figures 1, 2 and 3 in particular, my improved wheel type tractor is shown as comprising a frame 10 which supports an operator's cab 11 and a hood 12 for the power plant 13. A fuel tank 14 is mounted on the frame 10 behind the cab 11 to supply fuel to the power plant 13. The frame 10 is supported by two front wheels 15 and 16 and two rear wheels 17 and 18.

The cab 11 which houses the operating controls of the tractor, is sealed to exclude heat and dust. An air conditioning unit 19 is provided to supply clean fresh air to its interior.

A depending frame 20, secured to the main frame 10 between the front wheels 15 and 16 and the rear wheels 17 and 18, supports the draw-bar 21 on the tractor. The draw-bar 21 has at its rear end a clevis 22 and a guide frame 23 to which tillage implements may be attached. With the draw-bar 21 attached below and in front of the axis of the rear wheels 17 and 18, the drag of the implements on the drawbar 21 tends to pull the four wheels 15, 16, 17 and 18 down so that additional traction is applied when the drawbar is used to pull implements. The forwardly mounted motor 13 and the position of the wheels 15, 16, 17 and 18 with respect to the frame and motor is such as to evenly distribute the pull on the wheels.

The wheels 15 and 16 support a suspended front axle 24 and the wheels 17 and 18 support a suspended rear axle 25. The front axle 24 has at its center a front differential unit 26 and the rear axle 25 has at its center a rear differential unit 27. The axles 24 and 25 and the differentials 26 and 27 are identical so it is believed that a description of one will suffice for both.

Figure 4:
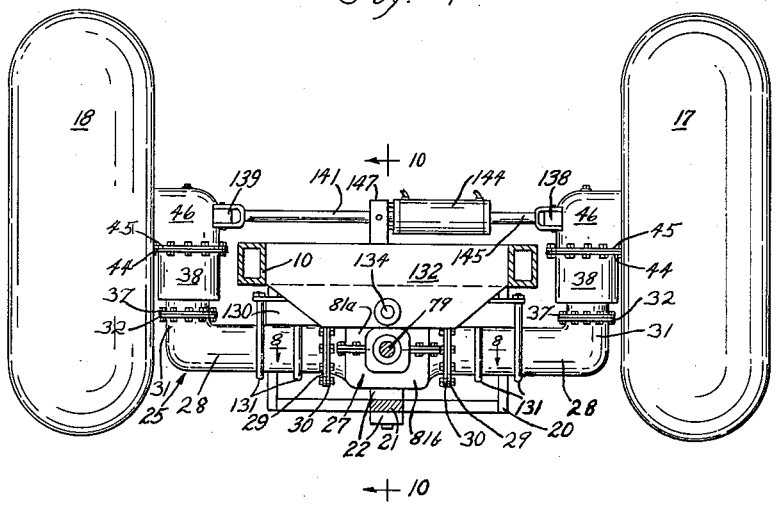
Figure 4 is a vertical sectional view taken substantially on the line 4—4 of Figure 3.

The axle 25, best shown in Figures 4 and 7, is composed of several sections. A horizontal tubular member 28 with a flange 29 at its inner end is fastened to each side of the differential unit 27. The unit 27 has cooperating flanges 30 to which the flanges 29 are bolted. The horizontal tubular members 28 extend outwardly beyond the frame 10 and have at their outer ends upturned portions 31 which have flanges 32 at their open ends. A vertical pipe section 36 is positioned at the outer end of each of the members 28 upon each of the upturned portions 31. Each pipe section 36 has a flange 37 near its lower end which is bolted to the flange 32 on the upturned portion 31 to secure the pipe section 36 in place. A sleeve 38 is positioned around the pipe section 36. The sleeve 38 has bearing seats 39 at each end to receive thrust bearings 40 and 41 therein. The thrust bearings 40 and 41 have their inner races seated on the pipe section 36 and secure it for rotation with respect to the sleeve 38. The upper end of the pipe section 36 is externally threaded to receive a nut 42 thereon. The nut 42 is positioned on the pipe section 36 directly above the bearing 41 and suspends the pipe section 36 on the bearing 41. In this manner the sleeve 38 supports the pipe section 36, and the horizontal member 28. A grease seal 43 is removably positioned at the lower end of the sleeve 38 adjacent the bearing 40 to seal the open end of the sleeve 38. A flange 44 is formed at the upper end of the sleeve 38 and cooperates with a flange 45 on a tubular elbow member 46 to secure the sleeve 38 to the member 46. The member 46 has its outwardly extending tubular portion 47 provided with a flange 48 at the outer end. To the flange 48 a tubular spindle 49 is bolted. The spindle 49 has cone bearings 50 mounted thereon which rotatably support a wheel hub 51. The hub 51 receives the wheel 15, 16, 17 or 18 in the usual manner. Each of the wheel hubs 51 also supports a brake drum 52. The spindles 49 support brake shoe mechanisms 53 of conventional construction.

The drive mechanisms for each of the wheels 15, 16, 17 and 18 extend through the axles 24 and 25 from the differentials 26 and 27. A drive shaft 54 extends from each side of the differential unit 26 or 27 through the horizontal members 28. Thrust bearings 55 seated in the members 28 secure the drive shafts 54 for rotation therein. At the outer end of each drive shaft 54 a small bevel gear 56 is secured. The bevel gear 56 drives a larger bevel gear 57 which is mounted at the lower end of a shaft 58 which is positioned within the pipe section 36. The pipe section 36 has seats 59 at each end to receive thrust bearings 60 which secure the shaft 58 for rotation within the pipe section 36. The shaft 58 extends below the lower end of the pipe section 36 into the upturned portion 31 of the member 28. The bevel gear 57 is fixed to the lower end of the shaft 58. The upper end of the shaft 58 extends above the upper end of the pipe section 36 and into the member 46. A small bevel gear 61 mounted on the upper end of the shaft 58 within the member 46 drives a larger bevel gear 62 which is fixed on a horizontal shaft 63. The shaft 63 extends through the outwardly extending tubular portion 47 of the member 46. A thrust bearing 64 is seated in the portion 47 near the gear 62 and secures the shaft 63 for rotation within the portion 47. The shaft 63 extends through the spindle 49 and outwardly a short distance beyond it. The shaft 63 is splined at its outer end as shown in 63a in Figure 7 to receive a place 65. A cap screw 66 threads into the end of the shaft 63. A large washer 67 between the head of the cap screw and the shaft 63 secures the plate 65 on the splined portion of the shaft 63. The plate 65 is bolted by bolts 65a to the end of the hub 51 so that as the shaft 63 is rotated within the spindle 49, it drives the wheel hub 51 which is mounted on the exterior surface of the spindle 49.

With the construction just described, stationary axle members are provided to suspend the frame 10 of the tractor between the wheels 15, 16, 17 and 18. These axles are constructed of the several separate members 28, 36, 38, 46, 47 and 49 which are fastened together in such a manner that they may readily be separated when necessary to repair or replace parts. The drive mechanism comprising the shafts 54, 58 and 63 and the bevel gears 56, 57, 61 and 62 is completely sealed within the axle unit so that it may operate free of dust and grit. In order to adjust the units so that the correct contact may be made between the bevel gears 56 and 57 and the bevel gears 61 and 62, shims 68 may be placed between the flanges 32 and 37 and the flanges 44 and 45. The number of the shims 68 may be varied to produce the placement desired.

The method of supplying power to the differentials 26 and 27 from the power plant 13 is best shown in Figures 2 and 3. Power is supplied by the power plant 13 to a main transmission unit 69 through the usual clutch (not shown). A lever 70 protruding from the transmission unit 69 actuates the clutch mechanism. The main transmission unit 69 may be of any suitable construction, and being a very well known unit, will not be shown or described in detail. The unit 69 includes means to transmit power at several speeds, both in a forward and a reverse direction. The correct speed and direction may be selected by a shifting lever 71 which extends from the unit 69. A drive shaft 72 connects the transmission 69 to a second transmission unit 73. The unit 73 described later herein, has gear means therein to further increase or reduce the speed of the vehicle and may be of any of several types. The unit 73 shown in Figure 6, however, is a two speed transmission having an underdrive and an overdrive position. A center differential unit 74 is positioned directly beneath the second transmission 73 and is driven thereby. Two drive shafts 75 and 76 extend from the center differential unit 74. The drive shaft 75 extends forwardly to the front differential 26. The drive shaft 76 extends rearwardly to the rear differential unit 27. Both shafts have universal joints in them. Universal joints 77 and 78, at the ends of short shafts 79 connect the drive shafts 75 and 76 to stub shafts 80 extending from the front and rear differential units 26 and 27. In this manner, power developed in the power plant 13 is transmitted through the main transmission 69, the shaft 72, and the second transmission unit 73, to the center differential 74. The center differential 74 provides the power and transmits it through the drive shaft 75 and the shafts 79 and 80 connected thereto by the corresponding universal joints 77 and 78 to the front differential 26 and through the shafts 76, 79 and 80 to the rear differential 27. The three differential units 26, 27 and 74 are identical except for the method of applying power thereto.

The front and rear differential units 26 and 27, best shown in Figure 8, each comprise a housing which is formed of two sections, an upper section 81a and a lower section 81b. The sections 81a and 81b have cooperating flanges thereon which are bolted together by bolts 83. Power is supplied by the shaft 80 which extends into the housing 81a—81b at the front end thereof. A bearing 84, held in place by an externally threaded nut 85, rotatably supports the shaft 80 in the housing 81a—81b. A grease seal 86 seals the housing from dust and dirt. A bevel gear 87 is fixed to the end of the shaft 80 inside the housing 81a—81b. The bevel gear 87 drives a second bevel gear 88 which is fixed to a cross shaft 89. The shaft 89 is supported at each end by thrust bearings 90 which are seated in the housing 81a—81b. The shaft 89 also supports a pinion 91 which is keyed thereon by a key 92. The pinion 91 drives a large ring gear 93 which is bolted by bolts 93a to a spider housing 94. The spider housing 94 is supported by thrust bearings 95 which seat in bearing supports 96 and 97. The supports 96 and 97 are formed as part of the housing 81a—81b. Within the spider housing 94 is mounted the usual differential spider 98 having stub shafts 99 extending outwardly therefrom. Spider gears 100 are mounted on the shafts 99 within the housing 94. Also within the housing 94 are positioned two bevel gears 101 which are in engagement with the spider gears 100. The gears 101 are each secured to the inner end of one of the drive shafts 54 which extend outwardly through the axle members 28.

With this construction, when the drive shaft 80 is driven, it transmits power through the bevel gear 87 to the bevel gear 88, thus rotating the cross shaft 89. This rotates the pinion 91 which drives the ring gear 93. Since the spider housing 94 is bolted to the ring gear 93, it also is rotated, and in turn rotates the spider 99. If the traction of the wheels to be driven is equal, the differential spider gears 100 do not rotate on the stub shafts 99, but act as stationary connections and cause the two bevel gears 101 to be rotated at the same speed. Power is then transmitted equally to the drive shafts 54 extending from each side of the differential, and each of the wheels is turned. However, if one wheel has less traction than the other, the shaft 54 supplying power to that wheel will be more easily rotated. In this case, the spider gears 100 will be rotated on their stub shafts 99 and will turn the bevel gear 101, on the shaft 54 which is free, at a higher speed than the opposite bevel gear 101. This action is, of course, well known in the automotive field and is not included as part of the present invention.

However, it is desirable at times to concentrate the power delivered to the axle 24 or 25 in one of the wheels because one wheel may have less traction than the other. An example of this is when the tractor is travelling along a side hill. The up hill wheel on the axle 24 or 25 supports less weight than does the down hill wheel, due to the shifting of the center of gravity toward the down hill side of the machine. In this event, the uphill wheel will have poor traction and will tend to spin and the down hill wheel will slow down. By locking the differential 26 or 27, power may be concentrated at the downhill wheel, and, the uphill wheel will be prevented from spinning.

To accomplish this, I provide a locking mechanism in each differential which may be operated while the tractor is in motion. Within the differential housing 81, gears 102 and 103 are fixed to the drive shafts 54. These gears are positioned on the shafts 54 adjacent the bearing supports 96 and 97 as shown in Figure 8. A free shaft 104 is journalled in the housing 81 behind the shafts 54 and extending across the housing 81 parallel to the shafts 54. The shaft 104 is supported at each end by thrust bearings 105 which seat in the housing 81. Fixed to the shaft 104 near one end thereof is a gear 106. The gear 106 is in driving engagement with the gear 102 on the left hand shaft 54. In this manner, as the left hand shaft 54 is rotated it rotates the shaft 104. At the opposite end of the shaft 104, a sleeve 107 is mounted. The sleeve 107 is shown as being splined to the shaft 104 although it may be pinned or keyed thereon. The sleeve 107 rotatably mounts a gear 108 which is in driving engagement with the gear 103 fixed to the right hand shaft 54. Adjacent the gear 108, a clutch 109 is positioned. The clutch 109 is slidably but non-rotatably fixed to the shaft 104. The clutch 109 shown in Figure 8 is a double friction clutch which consists of two friction plates 110 and 111 and three clutch members 112, 113 and 114 which bear against them to hold the members 110 and 111 from rotation with respect to the shaft 104. The friction plates 110 and 111 are fixed to the gear 108, so that when they are secured by the clutch members 112, 113 and 114, the gear 108 is secured against rotation with respect to the shaft 104. The members 112, 113 and 114 are pressed together by means of a cam and lever mechanism indicated by the numeral 115. The cam and lever mechanism 115 is old and well known so it is believed that a detailed description is unnecessary. A collar 116 and a shifting yoke 117 are provided to actuate the clutch 109.

With the construction just described, the two shafts 54 may be locked together so that equal speed is transmitted to the two wheels regardless of the traction of the wheels. The wheel having the best ground engagement to prevent spinning takes the most power. When the clutch 109 is engaged, the gear 108 is secured so that it must turn at the same speed as the shaft 104 and the gear 106. Since the gears 106 and 108 engage the gears 102 and 103, these gears 102 and 103 must turn at the same rate of speed. This, of course, means that the shafts 54 must turn together. When the clutch 109 is released, the shafts 54 are no longer tied together, and may be driven in the ordinary manner by the differential unit 26 or 27. It should be noted that the clutch control 109 will enable the locking mechanisms to be put into operation while the tractor is in motion, thus allowing the operator to utilize them at any time necessary.

Figure 6:
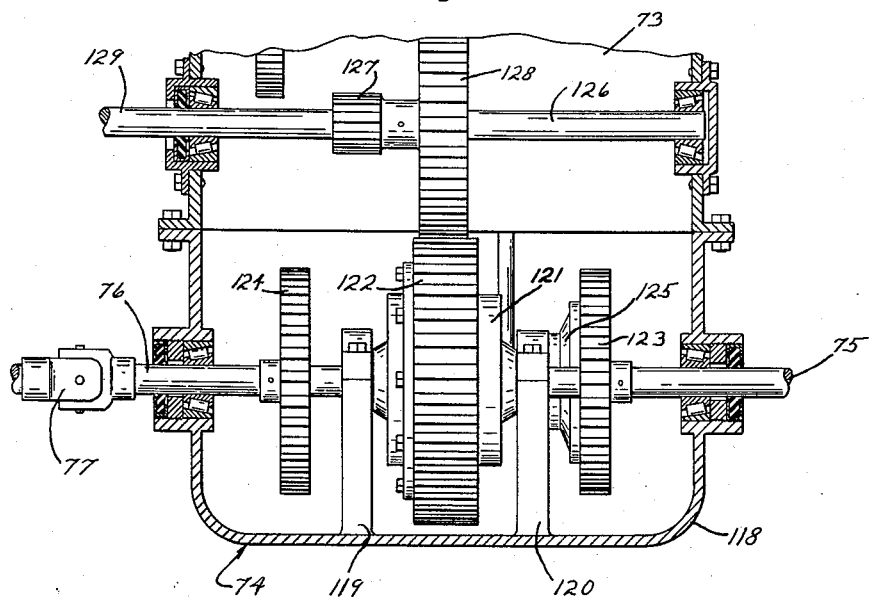
Figure 6 is an enlarged sectional view of the center differential unit taken substantially on the line 6—6 of Figure 3.
Figure 9:
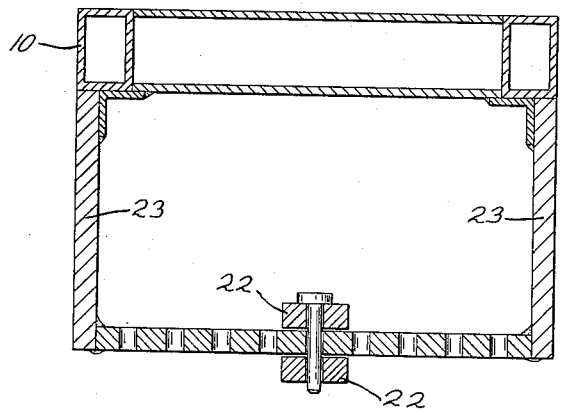
Figure 9 is a fragmentary sectional view taken on the line 9—9 of Figure 2.

The center differential unit 74, shown in Figure 6, is identical to the front and rear differential units except for the method of applying power thereto.

The center differential unit 74 has a housing 118 which is bolted onto the bottom of the second transmission unit 73. In the housing 118 bearing supports 119 and 120 are provided. These supports 119 and 120 rotatably support a spider housing 121 in the same manner that the spider housing 94 of the front and rear differentials is supported. The spider housing 121 contains the usual spider and bevel gears which operate to rotate the shafts 75 and 76. The spider housing supports a large ring gear 122, similar to the gear 93 of the front and rear differentials, and is rotated by this gear 122. A locking mechanism is included in the center differential 74 which is identical to that shown in Figure 8. It consists of gears 123 and 124 which are fixed on the drive shafts 75 and 76. A free shaft (not shown) mounts two gears (not shown) which engage the gears 123 and 124. One of the gears on the free shaft is fixed and the other is rotatable on the shaft. A clutch 125 operates in the same manner as the clutch 109 to secure the rotatable gear to the free shaft and lock the shafts 75 and 76 together.

The center differential 74 receives power directly from the second transmission 73. The unit 73 has an idler shaft 126 therein which mounts two gears 127 and 128. The gear 127 is of substantially smaller diameter than the gear 128. The gear 128 is in driving engagement with the ring gear 122. Directly above the shaft 126, the drive shaft 72 enters the unit 73. The shaft 72 has a splined portion 72a which slidably mounts two gears 127a and 128a. One of these gears is substantially larger than the other. These two gears are connected to a shifting lever so that they may be slid back and forth along the shaft 72. The gears are so positioned on the shaft 72 that when they are slid one direction, the larger gear engages the small gear 127 on the shaft 126. With this engagement power is transmitted through the gear 127 to the shaft 126 and it is rotated at a higher rate of speed than the shaft 72. The gear 128 is rotated and drives the ring gear 122, thus rotating the front and rear drive shafts 75 and 76. If the gears on the shaft 72 are slid in the opposite direction, the smaller gear engages the gear 128 and drives it at a slower rate of speed. In this manner, the second transmission unit serves to give an underdrive and an overdrive speed to the center differential. The shaft 126 of the unit 73 has a portion 129 which extends out of the housing to provide a power take-off for supplying power to equipment drawn by the tractor.

It should be understood that the particular transmission shown and described herein is illustrative only. The transmission units 69 and 73 may be replaced by a single transmission having suitable power transmitting characteristics. The driving engagement of this transmission to the center differential 74 would be similar to that shown in Figure 6.

Figure 10:
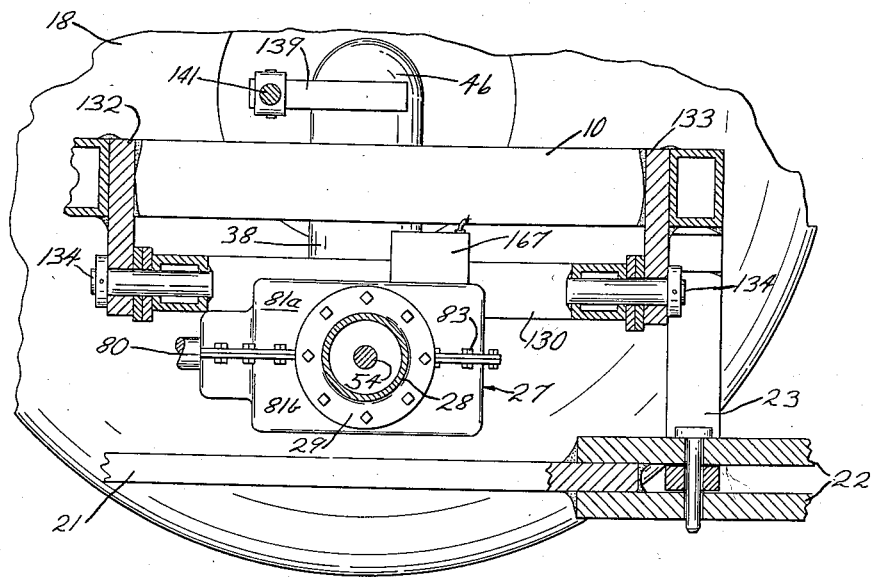
Figure 10 is an enlarged fragmentary sectional view taken on the line 10—10 of Figure 4.

In order for the tractor to operate on uneven ground, it is necessary that one of the axles be able to tilt with respect to the frame 10. In this invention, the rear axle 25 is mounted in such a manner that it is free to pivot about the longitudinal axis of the frame 10. As shown in Figure 4, the axle 25 is mounted on a sub-frame 130 by U-bolts 131. The sub-frame 130 is positioned a short distance below the frame 10 and lies in a plane parallel to the plane of the frame 10. Two vertical plates 132 and 133 (see Figures 2 and 10) depending from the frame 10 at each end of the sub-frame rotatably support pivot pins 134. The pins 134 are fixed to the sub-frame 130. With this construction, the sub-frame 130 is secured to the frame 10 at only two points, and is able to pivot about these two points to enable the axle 25 to tilt when an uneven portion of ground is traversed. The front axle 24, however, is secured solidly to the frame 10 by U-bolts 135. It will be noted that the rocking action of the sub frame 130 will result in some displacement of the rear differential unit 27 with respect to the center differential unit 74. Due to the position of the rear differential 27 with respect to the pivot pin 134, however, this displacement of the differential unit 27 is no more than the normal tolerance of the couplings 77 and 78 will permit, so it is unnecessary to include a splined portion in the shaft 79.

My improved wheel tractor also includes separate steering control of the front and rear wheels. The method by which this is accomplished is as follows: As hereinbefore described, the vertical portion of each axle 24 and 25 comprises two concentric sleeves. These are the vertical pipe section 36 and the sleeve 38. These members 36 and 38 are separated by thrust bearings 40 and 41. The pipe section 36 is secured to the horizontal portion 28 of the axle 24 or 25, and is thus fixed with respect to the frame 10. The outer sleeve 38 is secured to the member 46 and the wheel 15, 16, 17 or 18. If the sleeve 38 is rotated on the pipe section 36, the wheel will be turned also. It should be noted that the drive mechanism to the wheel is in no way affected by the turning of the wheel. The vertical shaft 58 is positioned at the center about which the wheel is pivoted so the bevel gear 61 remains in the same position with respect to the gear 62 as the wheel pivots. The gear 62 merely moves around the gear 61. In order to turn the wheels 15 and 16 and the wheels 17 and 18, I provide lever arms 136 and 137 on the elbow members 46 of the front axle 24 and lever arms 138 and 139 on the elbow members 46 of the rear axle 25 as shown in Figure 3. The lever arms 136 and 137 on the front axle 24 are directed rearwardly of the machine and the lever arms 138 and 139 on the rear axle 25 are directed forwardly. The two levers 136 and 138 on the left hand side of the machine as viewed in Figure 3 are substantially longer than the levers 137 and 139 on the right hand side. A tie rod 140, which extends across the frame 10, pivotally connects the levers 136 and 137 together. A similar tie rod 141 connects the levers 138 and 139 together. With this construction, turning of either of the front wheels 15 or 16 will cause the other front wheel to follow. In a like manner, turning of either of the rear wheels 17 or 18 will cause the other rear wheel to follow. Mounted on the frame 10 behind the tie rod 140 is an hydraulic cylinder 142. The cylinder 142 has a piston rod 143 which is pivotally connected to the free end of the lever 136. When fluid is supplied to the cylinder 142 to cause the piston to move outwardly, the wheels 15 and 16 will be turned to the right. When the fluid is supplied to the opposite end of the cylinder 142, the wheels 15 and 16 will be moved to the left. A similar cylinder 144 and piston rod 145 are connected to the frame 10 and the lever 138 to turn the rear wheels 17 and 18. The cylinders 142 and 144 are connected to the frame 10 by universal joints 146 and 147 so that they may freely pivot to follow the levers 136 and 138.

The controls for the tractor are all conveniently located in the cab 11. Figure 5 shows these controls and includes a diagrammatic representation of the connection between the control elements and the members actuated by them. In the cab, there is positioned a main clutch lever 150 which is connected by links or other well known means to the main clutch actuating lever 70 in the front transmission unit 69. A gear shift 151 is connected to the shifting lever 71 on the main transmission 69 to operate that lever and select the desired gear ratio. A second shifting lever 152 extends downwardly into the second transmission unit 73 to shift the gears therein. Four brake pedals 153, 154, 155 and 156 are suspended from the front wall of the cab. The pedals 153, 154, 155 and 156 operate master cylinders 157, 158, 159 and 160 which are of standard construction, having spring loaded pistons therein to force fluid through brake lines indicated at 161 to the four separate wheel brakes. Also mounted on the front wall of the cab 11 is a steering control unit 162 which has steering levers 163 and 164 thereon. The steering lever 163 controls the fluid to the cylinder 142 connected to the front wheels 15 and 16 and the lever 164 controls the fluid to the cylinder 144 connected to the rear wheels 17 and 18. A pump 165, powered by the power plant 13, and reservoir 166 supply fluid under pressure to the control unit 162. By moving the lever 163 in one direction the wheels 15 and 16 are turned to the right. By moving the lever 163 in the other direction the wheels 15 and 16 are turned to the left. Movement of the lever 164 turns the rear wheels 17 and 18 in a similar manner.

The differential locking mechanisms for the three differential units 26, 27 and 74 are electrically controlled. The locking clutches 109 on the front and rear differentials 26 and 27 and the locking clutch 125 on the center differential 74 are actuated by means of solenoids 167 connected to the shifting yokes 117. The solenoids 167 are so connected that when energized, they move the yokes 117 to engage the clutches 109 and 125. When the solenoids 167 are de-energized, springs 168 move the yokes 117 to release the clutches 109 and 125. The three solenoids 167 are connected in parallel across a battery 169. As shown in Figure 5, a common wire 170 connects one side of each solenoid to the positive terminal of the battery 169. A common wire 171 connects the negative terminal of the battery 169 to three parallel switches 172, 173 and 174. The opposite pole of each switch 172, 173 and 174 is connected to one of the solenoids 167, so that closing of the switch 172 energizes the solenoid 167 connected to the clutch 109 in the front differential 26 and locks that unit. In like manner, closing of the switch 173 locks the center differential 74 and closing of the switch 174 locks the rear differential 27.

Since a locked differential results in equal rotation of both wheels on one axle, it also results in a loss of steering control and may be dangerous if the operator is not alert, means have been included in the cab to warn the operator when one of the differentials is locked. A small lamp 175 is connected directly across each solenoid 167 and is positioned above the switch 172, 173 or 174 controlling that solenoid. Thus, when a solenoid 167 is energized, current flows through the lamp 175 in that circuit and warns the operator that that differential is locked.

The operation and control of my improved wheel type tractor is very simple. The operator has the several controls conveniently positioned in front of him. He may turn the front and rear wheels by merely moving the steering levers 163 and 164 in the desired direction. Each lever operates independently of the other so he has a maximum of directional control of the vehicle. By moving the shifting levers 151 and 152, he may select any of a number of gear ratios for maximum efficiency for the implement used and the ground to be cultivated. The brake pedals 153, 154, 155 and 156 are so positioned that he may apply both left brakes with one foot and both right brakes with the other. If desired, he may apply any of the four brakes independently of the others.

If the operator finds that, for example the left front wheel 15, is slipping and thus receiving most of the power, he can flip the switch 172 and lock the front differential unit 26 without stopping or releasing the main clutch. If he finds that both front wheels 15 and 16 are slipping, he may flip the switch 173 and lock the center differential to insure that the rear wheels 17 and 18 receive adequate power. This locking and unlocking of the three differentials 26, 27 and 74 may be done at any time and under any conditions without necessitating anything more than the simple action of manipulating an electrical switch.

The tractor itself is constructed for maximum efficiency since all four wheels are powered and the front and rear wheels are separately steerable. Due to the unique construction of the axles 24 and 25, the wheels 15, 16, 17 and 18 may be of any size without raising the frame 10 high above the ground or lengthening or widening the wheel base to retain balance.

It is believed that the nature and advantages of my invention appear fully from the foregoing description.

Having thus described my invention, I claim:

1. In a wheel type tractor, a main supporting frame, front and rear supporting axles attached to said frame and extending transversely of said frame, upstanding portions at the outer ends of said axles, upwardly extending sleeves positioned concentrically around said upstanding portions, bearings seated between said upstanding portions and said concentric sleeves and supporting said upstanding portions for rotation within said sleeves, horizontal extensions secured to the top of said sleeves, wheels rotatably mounted on said extensions, differential driving units positioned in said supporting axles having powered input shafts therein and having output shafts therein extending through said axles, vertical shafts rotatably mounted in said upstanding portions and having bevel gears at their upper and lower ends, bevel gears on said output shafts in driving engagement with the bevel gears at the lower ends of said vertical shafts, horizontal driving shafts rotatably mounted within said horizontal extensions on said sleeves, bevel gears on the inner ends of said horizontal shafts in driving engagement with the bevel gears at the upper ends of said vertical shafts, and means connecting the free ends of said horizontal shafts to said wheels whereby to drive said wheels when power is applied to the differential input shafts.

2. In a wheel type tractor, a main supporting frame, front and rear supporting axles carrying said frame and extending transversely of said frame, upstanding portions at the outer ends of said axles, upwardly extending sleeves positioned concentrically around said upstanding portions and secured thereto by bearings for rotation thereon, elbow members fixed to the tops of said sleeves and having outwardly extending horizontal portions, wheels rotatably mounted on said horizontal portions, differential driving gear units positioned in each axle having powered input shafts therein and having output shafts therein extending outwardly through said supporting axles, driving means including bevel gears at the top and bottom of said upstanding portions whereby to drive said wheels when power is applied to said input shafts.

3. In a wheel type tractor, a main supporting frame, front and rear supporting axles beneath said frame and extending transversely of said frame, upstanding portions at the outer ends of said axles, upwardly extending sleeves positioned concentrically around said upstanding portions and secured thereto by bearings supporting said portions, elbow members fixed to the tops of said sleeves and having outwardly extending horizontal portions, wheels rotatably mounted on said horizontal portions, differential driving gear units positioned in each axle having powered input shafts therein and having output shafts therein extending outwardly through said supporting axles, upright shafts journalled in said upstanding axle portions and drivingly connected to the output shafts, and shafts journalled in said horizontal axle portions said last named shafts being drivingly connected to the upright shafts and secured to said wheels.

4. In a wheel type tractor, a main supporting frame, front and rear supporting axles carrying said frame and extending transversely of said frame, upstanding portions at the outer ends of said axles, upwardly extending sleeves positioned concentrically around said upstanding portions and secured thereto by bearings for rotation thereon, elbow members fixed to the tops of said sleeves and having outwardly extending horizontal portions, wheels rotatably mounted on said horizontal portions, differential driving gear units positioned in each axle having powered input shafts therein and having output shafts therein extending outwardly through said supporting axles, upright shafts journalled in said upstanding axle portions and drivingly connected to the output shafts, shafts journalled in said horizontal axle portions, said last named shafts being drivingly connected to the upright shafts and secured to said wheels, and steering means on the frame connected to the sleeves to turn the wheels.

5. In a wheel type tractor, a main supporting frame, a supporting axle beneath said frame, said axles extending outwardly beyond said frame and having upturned portions at their outer ends, vertical pipe sections seating on said upturned portions and being removably secured thereto, upwardly extending sleeves positioned concentrically around said pipe sections, bearing members between said sleeves and said pipe sections, said bearing members rotatably supporting said pipe sections within said sleeves, tubular elbow members seating on the tops of said sleeves above said pipe sections, said elbow members being removably secured to said sleeves, horizontal tubular extensions on said elbow members, spindles removably secured to said horizontal extensions, wheels rotatably mounted on said spindles, drive shafts journalled in said supporting axles, vertical shafts journalled in said pipe sections, and drivingly connected to said drive shafts, second drive shafts journalled in said horizontal extensions and extending outwardly through said spindles, said second drive shafts being drivingly connected to said vertical shafts, said second drive shafts extending outwardly beyond said spindles and having plates secured to the outer ends and to the wheels whereby to drive the wheels when power is applied to said first named drive shafts.

References Cited in the file of this patent

UNITED STATES PATENTS

| Number | Name | Date |
|---|---|---|
| 832,749 | Schmidt | Oct. 9, 1906 |
| 867,282 | Macfarren | Oct. 1, 1907 |
| 1,128,064 | Senderling | Feb. 9, 1915 |
| 1,207,658 | Swain | Dec. 5, 1916 |
| 1,253,833 | Johnson | Jan. 15, 1918 |
| 1,323,126 | Tolson | Nov. 25, 1919 |
| 1,458,560 | Tolson | June 12, 1923 |
| 1,490,758 | Benson | Apr. 15, 1924 |
| 1,835,412 | Livingood | Dec. 8, 1931 |
| 1,928,136 | Rodgers | Sept. 26, 1933 |
| 1,938,457 | McCaffery | Dec. 5, 1933 |
| 2,317,623 | Lee | Apr. 27, 1943 |
| 2,345,351 | Maxon et al. | Mar. 28, 1944 |
| 2,358,236 | Lee | Sept. 12, 1944 |
| 2,376,419 | Cole | May 22, 1945 |
| 2,393,557 | Orshansky | Jan. 22, 1946 |
| 2,404,925 | Sauer | July 30, 1946 |
| 2,432,721 | Brown | Dec. 16, 1947 |
| 2,685,777 | Plas | Aug. 10, 1954 |